United States Patent [19]

Higgins et al.

[11] 4,268,730

[45] May 19, 1981

[54] STYLUS PEN ACTUATING SWITCH

[75] Inventors: Bobby L. Higgins, Dallas; Luther M. Johnson, Garland, both of Tex.

[73] Assignee: Camsco, Inc., Richardson, Tex.

[21] Appl. No.: 70,972

[22] Filed: Aug. 30, 1979

[51] Int. Cl.³ ............................................. H01H 3/00
[52] U.S. Cl. .................................. 200/52 R; 178/18; 200/61.42
[58] Field of Search ............. 200/52 R, 159 R, 159 A, 200/159 B, 340, 67 D, 67 DA, 67 DB, 61.41, 61.42, 61.44, 61.25; 178/18, 19, 20; 340/365 R, 710

[56] References Cited

U.S. PATENT DOCUMENTS

| | | | |
|---|---|---|---|
| 2,334,271 | 11/1943 | Malm et al. | 200/61.42 |
| 3,626,483 | 12/1971 | Whetstone et al. | 178/18 |
| 4,065,651 | 12/1977 | Erni et al. | 200/159 B |

*Primary Examiner*—J. V. Truhe
*Assistant Examiner*—Morris Ginsburg

[57] ABSTRACT

An actuating switch (30) is provided for a stylus pen (10). The actuating switch (30) includes a first contact (74) and a second contact (78). A spring (100) is disposed between the first contact (74) and the second contact (78), such that when pressure is applied to the stylus pen (10) to actuate the switch (30) the spring (100) compresses to simultaneously contact both the first contact (74) and the second contact (78) to positively actuate the switch (30) and provide a sensed indication of movement to an operator to alert the operator of closure of switch (30).

10 Claims, 3 Drawing Figures

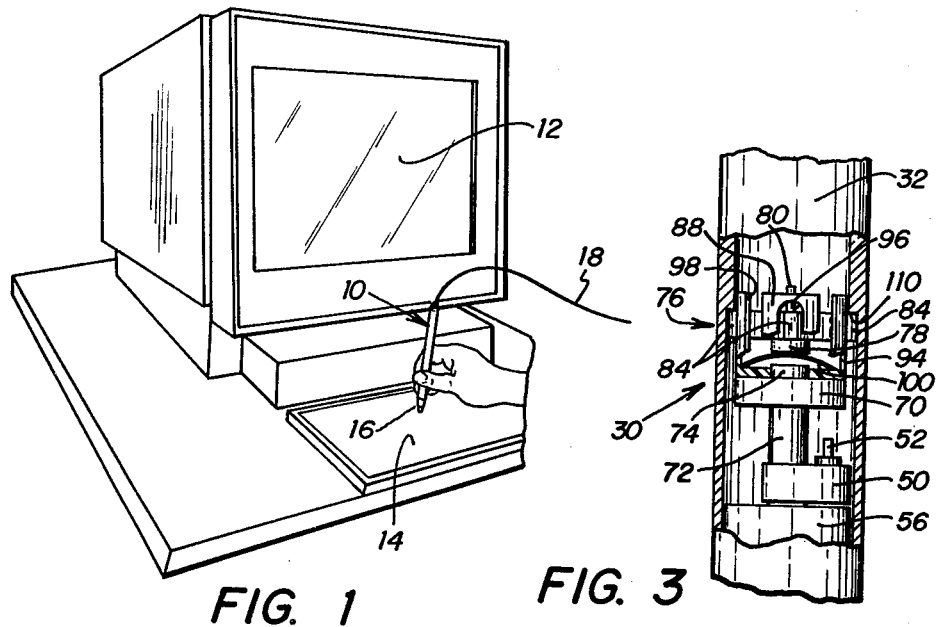
FIG. 1
FIG. 3
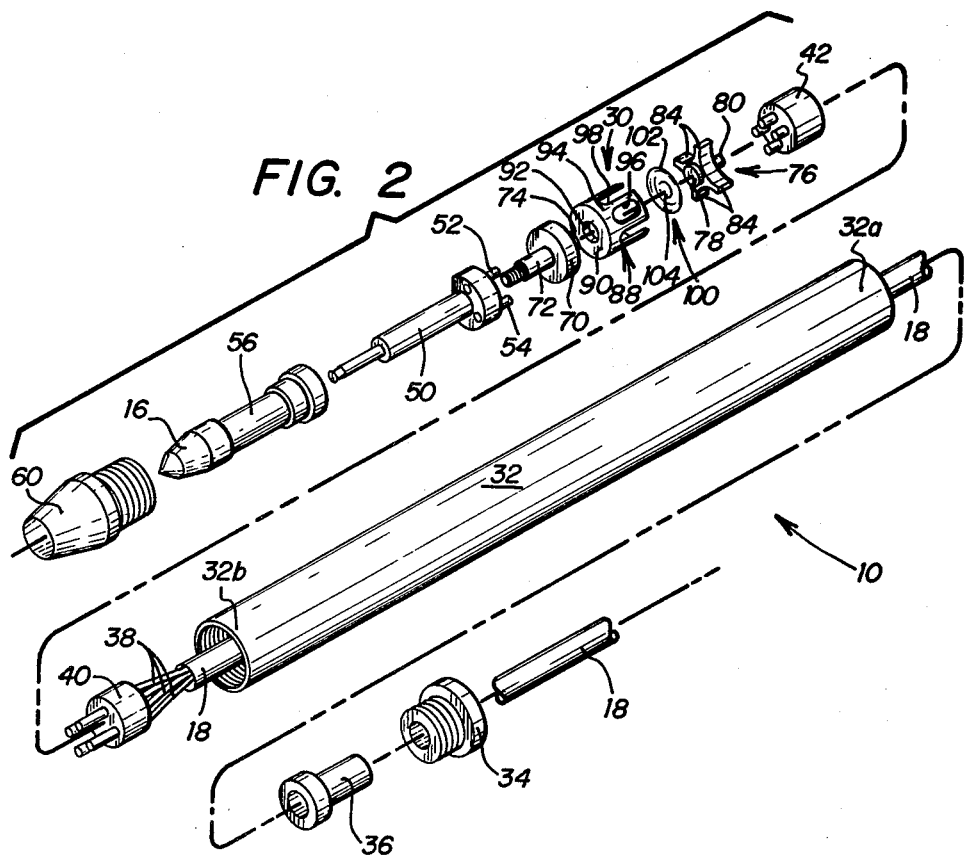
FIG. 2

STYLUS PEN ACTUATING SWITCH

TECHNICAL FIELD

This invention relates to stylus pens, and more particularly to a stylus pen actuating switch that provides a positive indication to an operator of switch actuation.

BACKGROUND ART

Stylus pens are typically utilized in combination with a cathode ray tube display screen and a data tablet in which an operator can manipulate data and shapes represented on the display screen by movement of the stylus with respect to the data tablet. One such use of a stylus pen and data tablet is illustrated in U.S. Pat. No. 3,887,903 issued to Martell on June 3, 1975 and entitled "Interactive Man-Machine Method and System for Grading Pattern Pieces and For Producing an Apparel Marker". In such an application, representations of pattern pieces are displayed on a screen for grading, generation of additional pattern sizes and for manipulation to generate a marker for use in the cutting of fabric in the production of garments. An operator through the use of a stylus pen and a data tablet controls the movement of the pattern pieces and grading by interacting with a computer. Input to the computer is controlled through the actuation of the stylus pen by contacting the stylus pen with the surface of the data tablet to "acquire" pattern pieces shown on the display screen, such that the pattern piece will track the movement of the pen with respect to the data tablet.

In the process of acquiring or identifying a particular pattern piece or data on the display screen, the stylus pen is pressed against the data tablet with a small amount of pressure. This pressure activity is utilized to select a pattern piece for manipulation and to answer questions asked by a monitor which are displayed on the display screen in the system described above. The amount of pressure necessary to actuate the stylus pen is minimal; however, the operator must be aware that sufficient pressure has been exerted to actuate the switch of the stylus pen. Previously developed stylus pens have not provided sufficient feedback to the operator to alert the operator that switch actuation has taken place. In such instances where the operator does not know that the stylus pen switch has been actuated, the operator continually applies pressure to the stylus pen which results in damage to the stylus pen and data tablet surface. In order for an efficient use of the stylus pen and data tablet the operator must be free to quickly interact with the display screen in a fluid-like motion with minimal interruptions. Therefore, it is essential that the operator know when the stylus pen switch has been actuated without continuously depressing or applying unnecessary pressure to the stylus pen tip against the surface of the data tablet.

A need has thus arisen for a stylus pen actuating switch wherein the operator has positive feedback of switch actuation and wherein the switch can be actuated with a minimal amount of pressure. A need has further arisen for an actuating switch for a stylus pen which is reliable and maintenance free.

DISCLOSURE OF THE INVENTION

In accordance with the present invention, an actuating switch for a stylus pen is provided which substantially eliminates the problems heretofore associated with switches of stylus pens including insufficient feedback to the operator of switch actuation.

In accordance with the present invention, in a stylus pen, an actuating switch is provided. The actuating switch includes first and second contacts. A spring is disposed between the first and second contacts, such that when pressure is applied to the stylus pen to actuate the switch, the spring compresses to simultaneously contact both the first and second contacts to positively actuate the switch and provide a sensed indication of movement to the operator to alert the operator of switch closure.

In accordance with another aspect of the present invention, a stylus pen is provided for use with a data tablet. The stylus pen includes a housing having first and second ends. First and second switch contacts are disposed within the housing. A pen tip is disposed at the first end of the housing for contacting the data tablet and for slidable movement within the housing. The first switch contact is interconnected to the pen tip. The second switch contact includes a stop device for engaging the housing, such that the second switch contact remains fixed within the housing. A spring is disposed between the first and second switch contacts to maintain the switch contacts in a spaced apart relation. When pressure is applied to the housing, the pen tip moves inwardly within the housing to cause the first switch contact to move towards the second switch contact to thereby compress the spring enabling simultaneous contact between the spring and the first and second switch contacts to positively actuate the switch and provide an indication to the operator of switch closure.

BRIEF DESCRIPTION OF DRAWINGS

For a more complete understanding of the present invention and for further objects and advantages thereof, reference is now made to the following Detailed Description taken in conjunction with the accompanying Drawings in which:

FIG. 1 is a perspective view of an interactive console including a display screen and data tablet utilizing the stylus pen of the present invention;

FIG. 2 is an exploded perspective view of a stylus pen utilizing the present actuating switch; and FIG. 3 is a side elevational view, partially broken away of the stylus pen actuating switch of the present invention.

DETAILED DESCRIPTION

Referring to FIG. 1, a stylus pen 10 utilizing the present actuating switch is illustrated. Stylus pen 10 is used with an interactive display system including a display screen 12 and a data tablet 14. Display screen 12 is used, for example, to display pattern pieces to be manipulated when making pattern markers. Data tablet 14 measures the position of stylus pen 10 manipulated by an operator, moving stylus pen 10 with respect to the surface of data tablet 14 and by applying pressure to a stylus pen tip 16. Manipulation of stylus pen 10 by the operator transmits the appropriate location information of stylus pen 10 to a central computer (not shown) via a cable 18. The computer (not shown) processes the location information and manipulates the representation of a pattern piece on display screen 12 accordingly.

Referring to FIG. 2, wherein like numerals are utilized for like and corresponding components previously identified, the actuating switch of the present invention is illustrated and is generally identified by the numeral 30. Actuating switch 30 is contained within a stylus pen housing 32 having ends 32a and 32b. Cable 18 is inserted into housing end 32a of stylus pen housing 32 through an end cap 34 and a lock device 36. Wires 38 contained within cable 18 terminate in a jack 40 which mates with a plug 42. Plug 42 receives wires (not shown) interconnected to actuating switch 30 and a coil 50. Coil 50 includes terminals 52 and 54 and functions in combination with data tablet 14 (FIG. 1). Coil 50 is disposed within a coil housing 56 and terminates in stylus pen tip 16. Coil housing 56 is secured to housing end 32b of stylus pen housing 32 using a coil retaining ring 60 which threadedly engages housing end 32b of stylus pen housing 32.

Referring simultaneously to FIGS. 2 and 3 wherein like numerals are utilized for like and corresponding components previously identified, actuating switch 30 includes a switch standoff 70. Switch standoff 70 includes a shaft 72 which threadedly engages coil 50. A contact 74 is disposed on switch standoff 70 opposite shaft 72 and functions as a first contact of actuating switch 30. Actuating switch 30 further includes a switch stop generally identified by the numeral 76. Switch stop 76 includes a contact 78 having a terminal 80. Contact 78 functions as a second contact of actuating switch 30. Terminal 80 receives a wire (not shown) for connection to plug 42. A second wire (not shown) is interconnected to switch standoff 70 which functions as a terminal for contact 74 and is received by plug 42. Switch stop 76 further includes arms 84 whose operation will be subsequently described.

Disposed between switch standoff 70 and switch stop 76 is an insulating washer 88. Insulating washer 88 includes an end portion 90 having an aperture 92 and a cylindrical portion 94 having apertures 96 and 98.

Aperture 92 is smaller in diameter than the diameter of contact 74. Apertures 98 function to receive the wires (not shown) from terminals 52 and 54 and shaft 72 to dress these wires within stylus pen housing 32.

An important aspect of the present invention is a spring 100 disposed between switch standoff 70 and switch stop 76 and received by insulating washer 88. Spring 100 aligns with contact 78 and aperture 92 within end portion 90 of insulating washer 88. Spring 100 is made from a flexible metallic material and is essentially circular in shape. Spring 100 includes an outwardly concave exterior surface 102 disposed adjacent contact 78 of switch stop 76. Spring 100 further includes an inwardly convex interior surface 104 disposed adjacent contact 74 of switch standoff 70.

Upon closure of actuating switch 30, contact is made between contact 74 of switch standoff 70 and contact 78 of switch stop 76 through spring 100. In the normal, biased position of spring 100 as illustrated in FIG. 3, contact 74 of switch standoff 70 and contact 78 are maintained in a spaced apart relationship and no electrical contact is possible due to the position of insulating washer 88.

As illustrated in FIG. 3, stylus pen housing 32 includes a shoulder 110 for receiving arms 84 of switch stop 76. Due to the interconnection of coil retaining ring 60 and housing end 32b of stylus pen housing 32, arms 84 of switch stop 76 are forced against shoulder 110 to maintain switch stop 76 in a fixed position within stylus pen housing 32.

In operation of the present actuating switch 30, when an operator applies pressure to stylus pen 10 by gripping stylus pen housing 32 and applying a downwardly directed pressure, stylus pen tip 16 will engage data tablet 14 (FIG. 1) which imparts an upwardly directed force against coil 50. This upwardly directed force in turn is imparted to switch standoff 70 through shaft 72. Movement of switch standoff 70 towards housing end 32a of stylus pen housing 32 exerts a force against spring 100 to compress spring 100 from the configuration as illustrated in FIG. 3 to a flattened configuration, such that the distance between contact 74 of switch standoff 70 and contact 78 of switch stop 76 equals the thickness of spring 100. In the compressed configuration of spring 100, spring 100 acts as a conductor to permit actuation of actuating switch 30 in that contact 74 of switch standoff 70 is allowed to make electrical contact through spring 100 with contact 78 of switch stop 76. Actuating switch 30 is then actuated and appropriate electrical signals are generated through cable 18. The pressure to compress spring 100 can be sensed and felt by the operator in manipulation of stylus pen 10 to provide positive feedback to the operator that actuating switch 30 has in fact been actuated. Due to the slight amount of pressure necessary to compress spring 100, no damage results to the surface of data tablet 14 (FIG. 1) or coil 50 in the use of stylus pen 10.

When pressure is released by the operator from stylus pen tip 16 spring 100 returns to its normal position as illustrated in FIG. 3 to break the contact between contact 74 of switch standoff 70 and contact 78 of switch stop 76. Spring 100 thereafter maintains contact 74 of switch standoff 70 and contact 78 in a spaced apart relationship to deactuate actuating switch 30 of stylus pen 10.

It therefore can be seen that the present invention, utilizing a spring disposed between contacts of an actuating switch for a stylus pen provide for a positive indication to an operator of actuation of the stylus pen switch. In this manner, excessive pressures utilized by an operator in manipulating a stylus pen are avoided to minimize damage to the stylus pen and the associated data tablet in an interactive display system. The actuating switch of the present invention is further easy to manufacture and maintenance free to provide an economical stylus pen.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. In combination with a stylus pen, an actuating switch comprising:
 a first contact;
 a second contact; and
 spring means disposed between said first and second contacts, such that when pressure is applied to the stylus pen to actuate the actuating switch, said spring means compresses to simultaneously contact both said first and second contacts to positively actuate the actuating switch and provide a sensed indication of movement to an operator to alert the operator of closure of the actuating switch.

2. The actuating switch of claim 1 wherein said spring means is essentially circular in shape having an outwardly concave exterior surface disposed adjacent said first contact and an inwardly convex interior surface disposed adjacent said second contact, such that upon compression, said spring means becomes essentially flat.

3. The actuating switch of claim 2 and further including:

insulating means disposed between said first and second contacts for receiving said spring means, such that a predetermined area of said interior surface of said spring means contacts said second contact upon actuation of the actuating switch.

4. A stylus pen for use with a data tablet comprising:

a housing having first and second ends;

means disposed at said first end of said housing for engaging the data tablet and for slidable movement within said housing;

first and second switch contacts disposed within said housing;

said first switch contact being interconnected to said engaging means;

said second switch contact including stop means for engaging said housing, such that said second switch contact remains fixed within said housing; and spring means disposed between said first and second switch contacts to normally maintain said switch contacts in a spaced apart relation, such that when pressure is applied to said housing said engaging means moves inwardly within said housing to cause said first switch contact to move toward said second switch contact and thereby compress said spring means enabling simultaneous contact between said spring means and said first and second switch contacts to positively actuate said switch contacts and provide an indication to an operator of switch closure.

5. The stylus pen of claim 4 wherein said spring means comprises:

compression spring means essentially circular in shape having an outwardly concave exterior surface disposed adjacent said second switch contact and an inwardly convex interior surface disposed adjacent said first switch contact, such that upon compression said spring means becomes essentially flat to simultaneously contact said first and second switch contacts.

6. The stylus pen of claim 4 wherein said housing further includes:

shoulder means for engaging said stop means, such that said spring means applied a force to said shoulder means upon compression of said spring means.

7. The stylus pen of claim 4 and further including:

insulating means disposed between said first and second switch contacts for receiving said spring means, said insulating means having a centrally disposed aperture for receiving said first switch contact.

8. The stylus pen of claim 6 wherein said stop means includes:

a plurality of radially extending arm means for engaging said shoulder means of said housing.

9. The stylus pen of claim 7 wherein said insulating means includes means for receiving and retaining said stop means.

10. The stylus pen of claim 7 wherein said insulating means includes a plurality of apertures for receiving a plurality of radially extending arm means of said stop means.

* * * * *